United States Patent
Ma et al.

(10) Patent No.: US 9,293,944 B2
(45) Date of Patent: Mar. 22, 2016

(54) SYSTEMS AND METHODS FOR PROVIDING POWER TO ONE OR MORE LOADS IN A CIRCUIT

(71) Applicant: The Board of Regents, The University of Texas System, Austin, TX (US)

(72) Inventors: Dongsheng Brian Ma, Austin, TX (US); Yikai Wang, Austin, TX (US); Rajdeep Bondade, Austin, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/394,345

(22) PCT Filed: Jun. 28, 2013

(86) PCT No.: PCT/US2013/048488
§ 371 (c)(1),
(2) Date: Oct. 14, 2014

(87) PCT Pub. No.: WO2014/004980
PCT Pub. Date: Jan. 3, 2014

(65) Prior Publication Data
US 2015/0097492 A1   Apr. 9, 2015

Related U.S. Application Data

(60) Provisional application No. 61/665,733, filed on Jun. 28, 2012.

(51) Int. Cl.
*H02J 7/34* (2006.01)
*H02M 3/158* (2006.01)
*H05B 33/08* (2006.01)

(52) U.S. Cl.
CPC .............. *H02J 7/345* (2013.01); *H02M 3/158* (2013.01); *H05B 33/0815* (2013.01); *Y02B 20/346* (2013.01); *Y10T 307/406* (2015.04)

(58) Field of Classification Search
CPC . F21S 4/001; A47G 33/0809; A47G 33/0818; A47G 2033/0827; F21Y 2101/02; H05B 33/0827; H05B 33/0818; H05B 39/09; H05B 33/0815; Y02B 20/347; Y02B 20/346; F21V 21/00; G09F 13/00; B60Q 1/387; B60Q 11/005; B01D 19/0042; B61L 29/288; H02J 7/345; H02M 3/158; Y10T 307/406

See application file for complete search history.

(56) References Cited

U.S. PATENT DOCUMENTS 4,203,151 A *   5/1980   Baker .............................. 363/43
4,523,269 A *   6/1985   Baker et al. .................... 363/138

(Continued)

FOREIGN PATENT DOCUMENTS

KR   10-2012-055324    5/2012
KR   10-2012-0065862   6/2012

OTHER PUBLICATIONS

International Search Report and Written Opinion mailed Oct. 9, 2013.

*Primary Examiner* — Vibol Tan
(74) *Attorney, Agent, or Firm* — Thomas | Horstemeyer, LLP (57) ABSTRACT

Disclosed are various embodiments for a power stage that can drive various types of loads. The power stage includes a first capacitor and a second capacitor that are coupled to the load. The power stage also includes switches that are operable in a first power stage state and a second power stage state. When the switches are in the first power stage state, the first capacitor discharges to the load, and the second capacitor charges. When the switches are in the second power stage state, the second capacitor discharges to the load, and the first capacitor charges.

18 Claims, 8 Drawing Sheets

(56) References Cited

U.S. PATENT DOCUMENTS

| | | | |
|---|---|---|---|
| 5,610,807 A * | 3/1997 | Kanda et al. | 363/43 |
| 6,563,269 B2 | 5/2003 | Robinett | |
| 6,583,575 B2 * | 6/2003 | Roh et al. | 315/169.1 |
| 8,461,815 B1 * | 6/2013 | Ngo | 323/271 |
| 8,493,036 B2 * | 7/2013 | Ferrario | 320/166 |
| 8,503,139 B2 * | 8/2013 | Yao et al. | 361/18 |
| 8,941,358 B2 * | 1/2015 | Xu et al. | 320/128 |
| 9,071,055 B2 * | 6/2015 | Ferrario | |
| 9,093,413 B2 * | 7/2015 | Xu et al. | |
| 9,093,414 B2 * | 7/2015 | Xu et al. | |
| 2008/0094042 A1 * | 4/2008 | Ferrario | 323/234 |
| 2010/0045248 A1 * | 2/2010 | Hawley | 323/282 |
| 2015/0084611 A1 * | 3/2015 | Agrawal | H02M 3/158 323/282 |

\* cited by examiner

SYSTEMS AND METHODS FOR PROVIDING POWER TO ONE OR MORE LOADS IN A CIRCUIT

CROSS-REFERENCE TO RELATED APPLICATION

This application is the 35 U.S.C. §371 national stage of, and claims priority to and the benefit of, PCT application PCT/US2013/048488, filed Jun. 28, 2013, which claims priority to and the benefit of U.S. Provisional Application No. 61/665,733, filed on Jun. 28, 2012, herein incorporated in their entirety.

BACKGROUND

DC-DC power supply systems may be used to efficiently power modern electronic devices and circuits. For example, light emitting diode (LED) circuits may employ an LED driver to illuminate one or more LEDs. To control the illumination, the LED driver may attempt to regulate output currents and output voltages such that they are at relatively constant levels. While early generation of LED drivers employed open loop driver designs, there may be considerable variations in the forward diode voltage of the LEDs due to process variations, operating temperatures, device ageing, the usage time of the LEDs, the wavelength of the light emitted by the LEDs, and/or other factors. Thus, closed loop drivers can be used to achieve uniform brightness and high efficiency.

Various LED drivers may employ buck, boost, or floating buck power stage topologies. Because some lighting systems may include a large number of LEDs connected in series, the output voltage for a power stage can be several tens of volts. Thus, switches in the power stage can be subjected to considerable voltage stress. As a result, the reliability of the power stage may be impacted.

Furthermore, various LED applications, such as backlights for display devices, may employ multiple "strings" of LEDs. Such systems may use multiple LED drivers. However, the use of multiple LED drivers may result in high costs and/or the use of bulky components, and the efficiency may be relatively poor. Additionally, complex control circuitry may be used to ensure that a relatively constant current is delivered by each power stage for each respective LED string.

In some power stage designs of LED drivers, low-voltage integrated circuit (IC) technologies cannot be used because of the corresponding dielectric breakdown, junction breakdown, hot carriers, and/or other parameters. Instead, high-voltage transistors comprising thick gate oxides and drain extensions may be used. However, high-voltage transistors may result in higher costs as compared to low-voltage transistors.

Various power stage designs may use multiple switches that are connected in series in order to distribute the voltage stress that a single switch would otherwise experience. However, having multiple switches perform the function of a single switch may increase the cost and/or silicon real estate requirements for an LED driver.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

DETAILED DESCRIPTION

Figure 1:
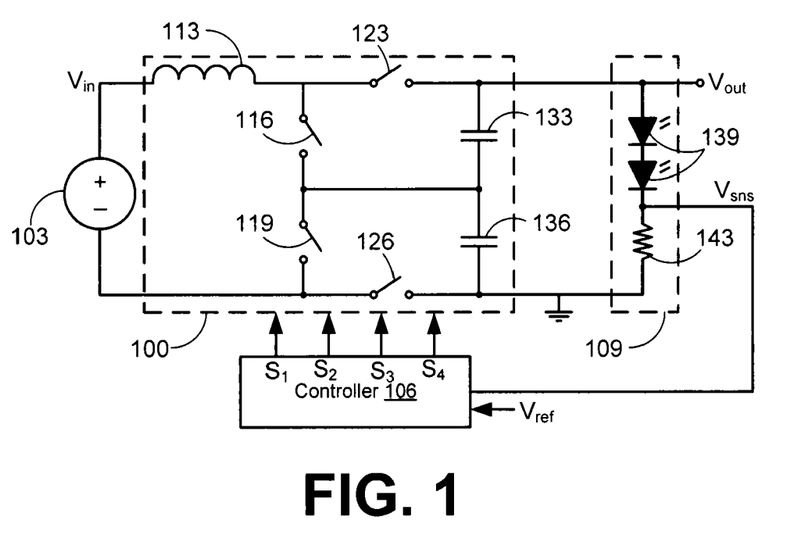
FIG. 1 is drawing of an example of a power stage.

The present disclosure is directed towards three-level power stages that can provide output voltages and/or currents to one or more loads. With reference to FIG. 1 shown is an example of a power stage 100. In particular, the power stage 100 shown in FIG. 1 is coupled to a voltage source 103, a controller 106, and a load 109.

The power stage 100 is configured to provide an output voltage $V_{out}$ for the load 109. As such, the power stage 100 may be regarded as being a direct current (DC)-to-DC converter, an LED driver, or any other type of circuitry that provides an output voltage $V_{out}$. Such a DC-DC converter in various embodiments may employ a three-level buck, a boost, a floating-buck, or any other type of suitable power stage architecture. The power stage 100 may be considered a three-level power stage, because various components of the power stage 100 may be subjected to three voltage levels at various times during operation.

In various embodiments, the power stage 100 comprises an inductor 113, a first switch 116, a second switch 119, a third switch 123, a fourth switch 126, a first capacitor 133, a second capacitor 136, and/or other components. The inductor 113 is a component that is configured to be energized and de-energized by suitably controlling the voltage across its terminals. In the embodiment shown in FIG. 1, the positive terminal of the inductor 113 is coupled to the positive terminal of the voltage source 103. The negative terminal of the inductor 113 is coupled to the first switch 116 and the third switch 123 as shown.

The first switch 116, the second switch 119, the third switch 123, and the fourth switch 126 are components that are configured to operate in respective on states and off states. When the first switch 116, for example, is in the off state, electrical currents are restricted from flowing through the first switch 116. Alternatively, configuring the first switch 116 to be in the on state facilities electrical currents flowing through the first switch 116. Thus, the first switch 116, the second switch 119, the third switch 123, and the fourth switch 126 can each selectively restrict and facilitate current flow. As such, in various embodiments, each of the first switch 116, the second switch 119, the third switch 123, and/or the fourth switch 126 may comprise a transistor, a relay, or any other suitable type of switching element. Such a transistor may be embodied in the form of a metal-oxide-semiconductor field-effect transistor (MOSFET), a bipolar junction transistor (BJT), or any other type of available transistor.

As shown in FIG. 1, a first terminal of the first switch 116 is coupled to the negative terminal of the inductor 113 and to a first terminal of the third switch 123. A second terminal of the first switch 116 is coupled to a first terminal of the second switch 119 and to a first terminal (e.g., the bottom plate in FIG. 1) of the first capacitor 133 and to a first terminal (e.g., the top plate) of the second capacitor 136 as shown. A first terminal of the second switch 119 is coupled to the second terminal of the first switch 116 and to the first terminal (e.g., the bottom plate) of the first capacitor 133 and the first terminal (e.g., the top plate) of the second capacitor 136 as shown. A second terminal of the second switch 119 is coupled to the negative terminal of the voltage source 103 and a first terminal of the fourth switch 126 as shown.

A first terminal of the third switch 123 is coupled to the negative terminal of the inductor 113 and to the first terminal of the first switch 116. A second terminal of the third switch 123 is coupled to a second terminal (e.g., the top plate in FIG. 1) of the first capacitor 133 as shown. The first terminal of the fourth switch 126 is coupled to the output terminal of the second switch 119 and to the negative terminal of the voltage source 103. The second terminal of the fourth switch 126 is coupled to the ground node and to a second terminal (e.g., the bottom plate) of the second capacitor 136.

The first capacitor 133 and the second capacitor 136 are each configured to charge and discharge, as may be appreciated. The second terminal of the first capacitor 133 is coupled to the second terminal of the third switch 123 and to the load 109 as shown. The first terminal of the first capacitor 133 is coupled to the first terminal of the second capacitor 136, to the second terminal of the first switch 116 and to the first terminal of the second switch 119 as shown.

The power stage 100 operates in various states to appropriately energize or de-energize the inductor 113, which will be discussed in more detail later. Additionally, in various states, the first capacitor 133 and/or the second capacitor 136 may be charged or discharged. To configure the power stage 100 in a particular state, the first switch 116, the second switch 119, the third switch 123, and/or the fourth switch 126 can be configured to be in appropriate on states or off states, as will be described in more detail later.

The voltage source 103 is configured to provide an input voltage $V_{in}$ to the power stage 100. To this end, the voltage source 103 may comprise, for example, a battery or any other suitable type of voltage supply.

The load 109 comprises one or more components that are powered through the output voltage $V_{out}$ from the power stage 100. In the embodiment shown in FIG. 1, the load 109 comprises one or more LEDs 139 and a resistor 143. Thus, the power stage 100 in the embodiment shown in FIG. 1 can be regarded as being an LED driver. In alternative embodiments, the load 109 can comprise a digital pulse generator (e.g., for an ultrasound medical imaging system) or any other type of component that is configured to receive power from the power stage 100.

A sense voltage $V_{sns}$ is also associated with the load 109. For example, the level of the sense voltage $V_{sns}$ may correspond to the level of the output voltage $V_{out}$, the average load current, and/or any other signal of interest. Thus, as will be discussed in more detail later, the sense voltage $V_{sns}$ can be used as an indicator in order to adjust the load current or the output voltage $V_{out}$ to a desired value.

The controller 106 is configured to control various aspects of the operation of the power stage 100. For example, the controller 106 may cause the first switch 116, the second switch 119, the third switch 123, and/or the fourth switch 126 to be in various on states or off states. To this end, the controller 106 outputs one or more control signals, such as the first control signal $S_1$, the second control signal $S_2$, the third control signal $S_3$, and the fourth control signal $S_4$ that control the first switch 116, the second switch 119, the third switch 123, and/or the fourth switch 126, respectively, to be in their desired states. For instance, for embodiments in which the first switch 116 is a n-channel MOSFET, the controller 106 can assert a high voltage control signal or a low voltage control signal, as applicable, to cause the first switch 116 to be in the on state or the off state.

The controller 106 in the embodiment of FIG. 1 also receives the sense voltage $V_{sns}$ and a reference voltage $V_{ref}$. The controller 106 may respond to a comparison between the level of the sense voltage $V_{sns}$ and the reference voltage $V_{ref}$ and adjust one or more control signals to thereby adjust the output voltage $V_{out}$ and/or the load current. For example, the controller 106 may increase or decrease one or more duty cycles for the power stage 100 in order to increase or decrease the level of the output voltage $V_{out}$. In this regard, the controller 106 may adjust the amount of time that one or more of the switches is in the open state or the closed state to thereby adjust the resulting output voltage $V_{out}$ and/or load current. Furthermore, the controller 106 can adjust the amount of time that the power stage 100 is in one or more of the various states to thereby adjust the resulting output voltage $V_{out}$. It is understood that any other suitable type of controller 106 can be used to control the power stage 100 in alternative embodiments.

With reference to FIGS. 2A-2D, a description of an example of the operation of the power stage 100 is provided. FIGS. 2A-2D are drawings depicting a progression of the power stage 100 in various states. In FIGS. 2A-2D, the controller 106 (FIG. 1) is not shown for the purposes of clarity.

Figure 2A:
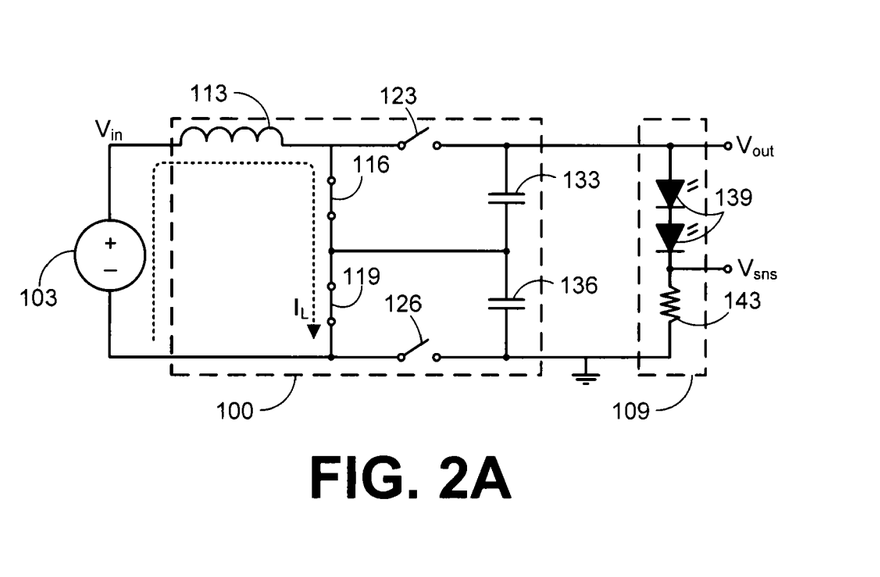
FIGS. 2A-2D are drawings showing an example of the operation of the power stage of FIG. 1.

Beginning with FIG. 2A, shown is the power stage 100 in a particular state. In this state, the first switch 116 is in the on state, the second switch 119 is in the on state, the third switch 123 is in the off state, and the fourth switch 126 is in the off state. Because these switches 116-126 are in these respective states, a positive voltage $V_{in}$ across the terminals of the inductor 113 results in a current $I_L$ that flows from the voltage source 103, through the inductor 113, through the first switch 116, through the second switch 119, and to the voltage source 103. As a result of the current $I_L$ flowing through the inductor 113, the inductor 113 becomes energized.

Additionally, the first capacitor 133 and/or the second capacitor 136 may have been previously charged. As such, when the power stage 100 is in the state shown in FIG. 2A, the first capacitor 133 and/or the second capacitor 136 may discharge to the load 109 and thereby provide the output voltage $V_{out}$. Thus, when the power stage 100 is in the state shown in FIG. 2A, the inductor 113 energizes, and the first capacitor 133 and/or the second capacitor 136 may discharge to the load 109.

Figure 2B:
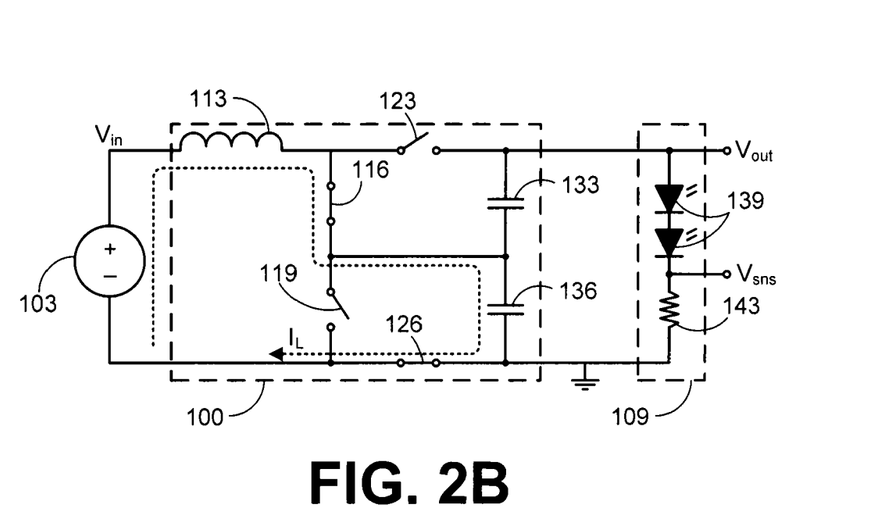

With reference to FIG. 2B, shown is the power stage 100 in another state. The controller 106 (FIG. 1) may configure the power stage 100 to be in this state subsequent to the power stage 100 being in the previous state shown in FIG. 2A.

In the state shown in FIG. 2B, the first switch 116 is in the on state, the second switch 119 is in the off state, the third switch 123 is in the off state, and the fourth switch 126 is in the on state. Because these switches 116-126 are in these respective states, a current $I_L$ flows from the voltage source 103, through the inductor 113, through the first switch 116, through the second capacitor 136, through the fourth switch 126, and to the voltage source 103. As a result, the inductor 113 de-energizes, and the energy from the inductor 113 charges the second capacitor 136. Additionally, when the power stage 100 is in the state shown in FIG. 2B, the first capacitor 133 may discharge to the load 109 and thereby provide the output voltage $V_{out}$. Thus, when the power stage 100 is in the state shown in FIG. 2B, the inductor 113 de-energizes, the second capacitor 136 charges, and the first capacitor 133 may discharge to the load 109.

Figure 2C:
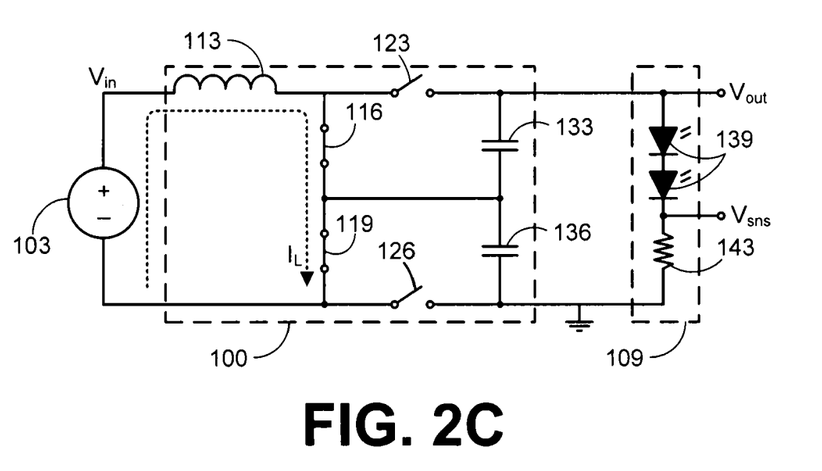

With reference to FIG. 2C, shown is the power stage 100 in another state. The controller 106 (FIG. 1) may configure the power stage 100 to be in this state subsequent to the power stage 100 being in the previous state shown in FIG. 2B.

In the state shown in FIG. 2C, the first switch 116 is in the on state, the second switch 119 is in the on state, the third switch 123 is in the off state, and the fourth switch 126 is in the off state. Because these switches 116-126 are in these respective states, a current $I_L$ flows from the voltage source 103, through the inductor 113, through the first switch 116, through the second switch 119, and to the voltage source 103. As a result of the current $I_L$ flowing through the inductor 113, the inductor 113 becomes energized.

Additionally, the first capacitor 133 and/or the second capacitor 136 may have been previously charged. As such, when the power stage 100 is in the state shown in FIG. 2C, the first capacitor 133 and/or the second capacitor 136 may discharge to the load 109 and thereby provide the output voltage $V_{out}$. Thus, when the power stage 100 is in the state shown in FIG. 2C, the inductor 113 energizes, and the first capacitor 133 and/or the second capacitor 136 may discharge to the load 109.

Figure 2D:
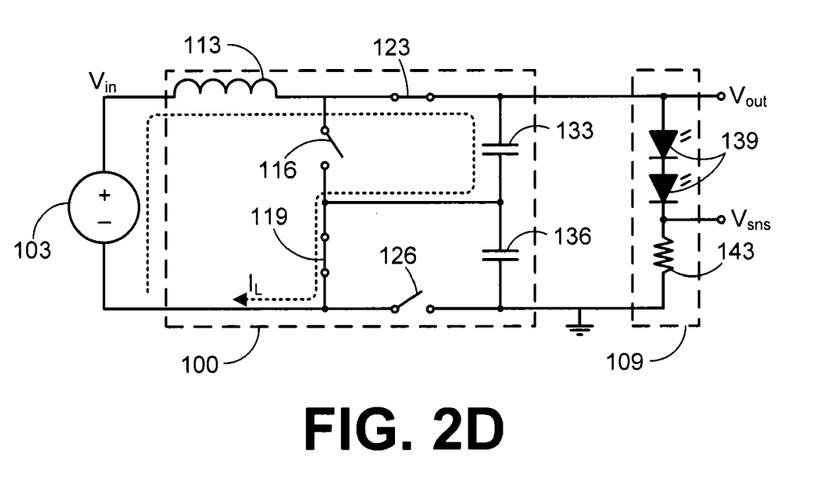

With reference to FIG. 2D, shown is the power stage 100 in another state. The controller 106 (FIG. 1) may configure the power stage 100 to be in this state subsequent to the power stage 100 being in the previous state shown in FIG. 2C.

In the state shown in FIG. 2D, the first switch 116 is in the off state, the second switch 119 is in the on state, the third switch 123 is in the on state, and the fourth switch 126 is in the off state. Because these switches 116-126 are in these respective states, a current $I_L$ flows from the voltage source 103, through the inductor 113, through the third switch 123, through the first capacitor 133, through the second switch 119, and to the voltage source 103. As such, the inductor 113 de-energizes to charge the first capacitor 133. Additionally, when the power stage 100 is in the state shown in FIG. 2D, the second capacitor 136 may discharge to the load 109 and thereby provide the output voltage $V_{out}$. Thus, when the power stage 100 is in the state shown in FIG. 2D, the inductor 113 de-energizes, the first capacitor 133 charges, and the second capacitor 136 may discharge to the load 109. The controller 106 may then configure the power stage 100 to be in the state that is shown in FIG. 2A, and the process described above with respect to FIGS. 2A-2D may be repeated.

It may be appreciated that in all of the states of the power stage 100 shown in FIGS. 2A-2D, the greatest voltage level across the first switch 116, the second switch 119, the third switch 123, and the fourth switch 126 is half of the level of the output voltage $V_{out}$. As such, various power stages 100 in accordance with the present disclosure may employ relatively low-voltage transistor technologies. For example, low-voltage transistors can be used for the first switch 116, the second switch 119, the third switch 123, and/or the fourth switch 126. As a result, the power stage 100 may occupy a relatively small area, with lower cost, improved circuit reliability, and potentially other benefits being achieved.

Figure 3:
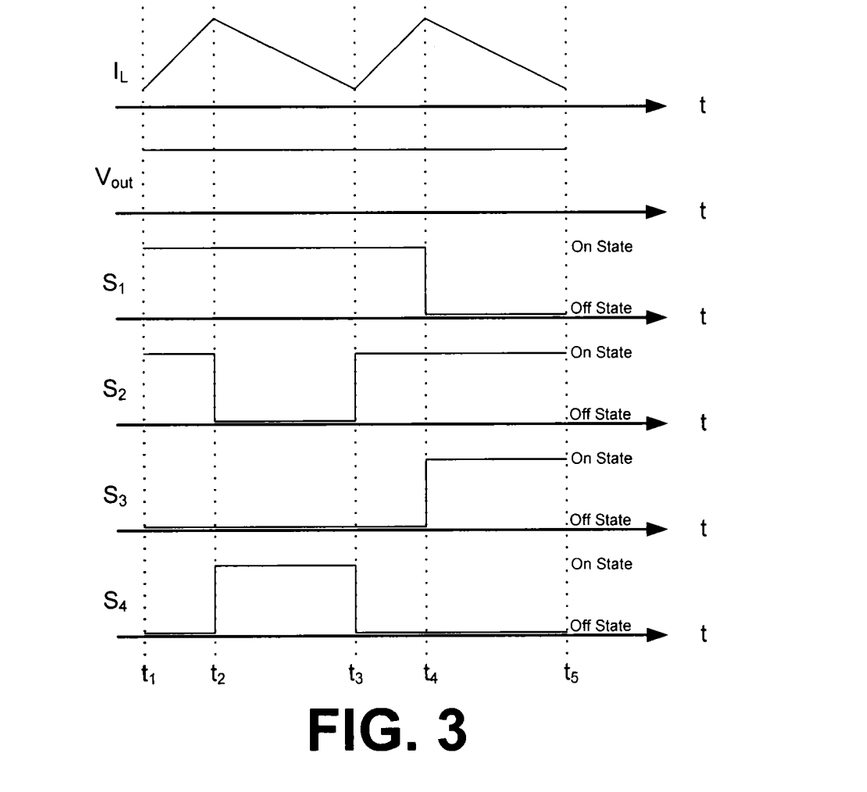
FIG. 3 is a timing diagram showing an example of signals associated with the power stage of FIG. 1.

With reference to FIG. 3, shown is a timing diagram depicting an example of the functionality associated with the power stage 100 (FIG. 1). In particular, the timing diagram of FIG. 3 shows the levels of the current $I_L$, the output voltage $V_{out}$ for the load 109 (FIG. 1), the first control signal $S_1$ that controls the first switch 116 (FIG. 1), the second control signal $S_2$ that controls the second switch 119 (FIG. 1), the third control signal $S_3$ that controls the third switch 123 (FIG. 1), and the fourth control signal $S_4$ that controls the fourth switch 126 (FIG. 1). In the embodiment shown in FIG. 3, high levels for the first control signal $S_1$, the second control signal $S_2$, the third control signal $S_3$, and the fourth control signal $S_4$ cause the respective switches to be in the on states. Additionally, low levels for the first control signal $S_1$, the second control signal $S_2$, the third control signal $S_3$, and the fourth control signal $S_4$ cause the respective switches to be in the off states. However, it is understood that in alternative embodiments, alternative signal levels may cause the respective switches to be in the off states or the on states.

Beginning at time $t_1$, the power stage 100 is in the state that was previously discussed with reference to FIG. 2A. As shown in FIG. 3, the current $I_L$ increases as time progresses due to the positive voltage of $V_{in}$ across the terminals of the inductor 113. Additionally, the output voltage $V_{out}$ is at a relatively constant level. The first control signal $S_1$ and the second control signal $S_2$ are high, causing the first switch 116 and the second switch 119 to be in on states. The third control signal $S_3$ and the fourth control signal $S_4$ are low, causing the third switch 123 and the fourth switch 126 to be in off states.

At time $t_2$, the power stage 100 transitions to the state that was previously discussed with respect to FIG. 2B. As shown, the current $I_L$ decreases as time progresses due to a negative voltage $V_{in}$-$V_{out}$/2 being across the terminal of the inductor 113. Additionally, the output voltage $V_{out}$ is at a relatively constant level. The first control signal $S_1$ and the fourth control signal $S_4$ are high, causing the first switch 116 and the fourth switch 126 to be in on states. The second control signal S2 and the third control signal S3 are low, causing the second switch 119 and the third switch 123 to be in off states.

At time $t_3$, the power stage 100 transitions to the state that was previously discussed with respect to FIG. 2C. As shown, the current $I_L$ increases as time progresses, and the output voltage $V_{out}$ is at a relatively constant level. The first control signal $S_1$ and the second control signal $S_2$ are high, causing the first switch 116 and the second switch 119 to be in on states. The third control signal $S_3$ and the fourth control signal $S_4$ are low, causing the third switch 123 and the fourth switch 126 to be in off states.

At time $t_4$, the power stage 100 transitions to the state discussed above with respect to FIG. 2D. As shown, the current $I_L$ decreases as time progresses, and the output voltage $V_{out}$ is at a relatively constant level. The second control signal $S_2$ and the third control signal $S_3$ are high, causing the second switch 119 and the third switch 123 to be in on states. The first control signal $S_1$ and the fourth control signal $S_4$ are low, causing the first switch 116 and the fourth switch 126 to be in off states.

Figure 4:
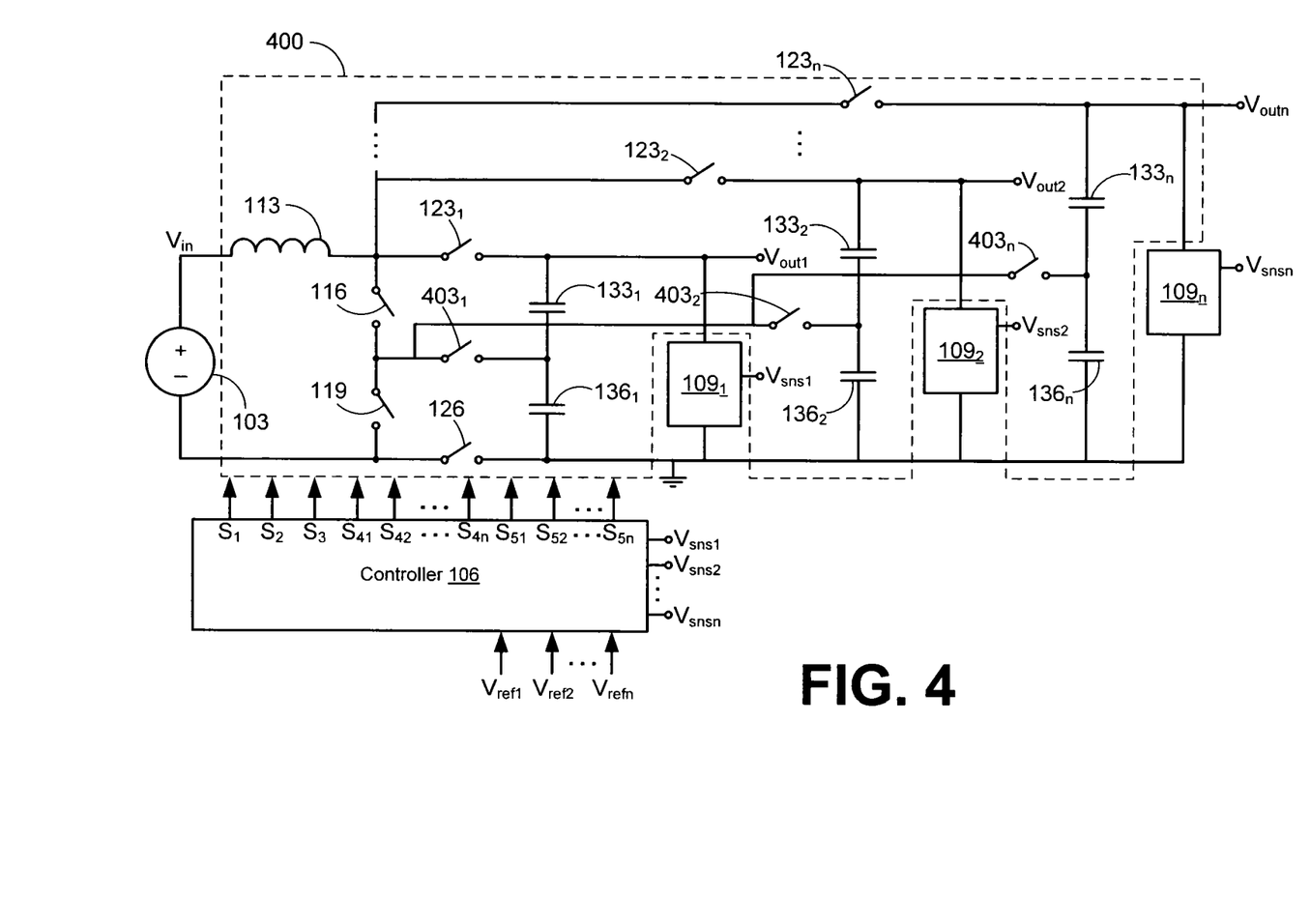
FIG. 4 is a drawing of another example of a power stage, which is capable of delivering multiple supply voltages.

With reference to FIG. 4, shown is a second example of a power stage 100, referred to herein as the power stage 400. In particular, the power stage 400 is shown coupled to the voltage source 103, the controller 106, and multiple loads 109, referred to herein as the loads $109_1$-$109_n$.

The power stage 400 is similar to the embodiment of the power stage 100 that is shown in FIG. 1. For example, the power stage 400 comprises the inductor 113, the first switch 116, the second switch 119, and the fourth switch 126. However, an instance of the first capacitor 133, referred to herein as the first capacitors $133_1$-$133_n$, and an instance of the second capacitor 136, referred to herein as the second capacitors $136_1$-$136_n$ are associated with each of the loads $109_1$-$109_n$. The first capacitors $133_1$-$133_n$ and/or the second capacitors $136_1$-$146_n$ charge and discharge in order to provide the corresponding output voltages $V_{out}$, referred to herein as the output voltages $V_{out1}$-$V_{outn}$, to the corresponding loads $109_1$-$109_n$.

Each of the loads $109_1$-$109_n$ is associated with a corresponding sense voltage $V_{sns}$, referred to herein as the sense voltages $V_{sns1}$-$V_{snsn}$. The levels of the sense voltages $V_{sns1}$-$S_{snsn}$ correspond to the respective output voltages $V_{out1}$-$V_{outn}$, their corresponding loading currents, and/or any other signal of interest. Thus, the sense voltages $V_{sns1}$-$V_{snsn}$ are provided to the controller 106 to facilitate adjusting the various output voltages $V_{out1}$-$V_{outn}$ to desired levels.

Respective instances of the third switch 123, referred to herein as the third switches $123_1$-$123_n$, are associated with the loads $109_1$-$109_n$. For example, the third switch $123_n$ corresponds to the load $109_n$. First terminals of the third switches $123_1$-$123_n$ are coupled to the inductor 113 as shown. Additionally, second terminals of the third switches $123_1$-$123_n$ are coupled to the respective first capacitors $133_1$-$133_n$ and the corresponding loads $109_1$-$109_n$. The third switches $123_1$-$123_n$, in conjunction with the fifth switches $403_1$-$403_n$, determine which first capacitors $133_1$-$133_n$ are to be charged. For instance, the third switch $123_1$ determines whether the first capacitor $133_1$ is to be charged, and the third switch $123_2$ determines whether the first capacitor $133_2$ is to be charged.

Additionally, fifth switches $403_1$-$403_n$ are associated with the respective loads $109_1$-$109_n$. In this regard, the fifth switch $403_1$ corresponds to the load $109_1$, the fifth switch $403_2$ corresponds to the load $109_2$, and the fifth switch $403_n$ corresponds to the load $109_n$. First terminals of the fifth switches $403_1$-$403_n$ are coupled to the first switch 116 and to the second switch 119 as shown. Additionally, respective second terminals of the fifth switches $403_1$-$403_n$ are coupled to the respective first capacitors $133_1$-$133_n$ and the respective second capacitors $136_1$-$136_n$ as shown.

The fifth switches $403_1$-$403_n$ are configured to operate in respective on states and off states. For example, when the fifth switch $403_n$ operates in the off state, electric currents are restricted from flowing through the fifth switch $403_n$. Alternatively, configuring the fifth switch $403_n$ to be in the on state facilitates the flow of electrical currents through the fifth switch $403_n$. In conjunction with the fourth switch 126, the fifth switches $403_1$-$403_n$ determine which first capacitors $133_1$-$133_n$ and second capacitors $136_1$-$136_n$ are to be charged. For instance, along with the fourth switch 126, the fifth switch $403_1$ determines whether the first capacitor $133_1$ and the second capacitor $136_1$ are to be charged, and the fifth switch $403_2$ along with the fourth switch 126 determines whether the first capacitor $133_1$ and the second capacitor $136_2$ are to be charged, and so on.

The controller 106 in the embodiment shown in FIG. 4 is similar to the controller 106 discussed with respect to the FIG. 1. In the embodiment shown in FIG. 4, the controller 106 receives the sense voltages $V_{sns1}$-$V_{snsn}$ as inputs. The controller 106 may also receive reference voltages $V_{ref1}$-$V_{refn}$. The respective reference voltages $V_{ref1}$-$V_{refn}$ may, for example, be compared to the sense voltages $V_{sns1}$-$V_{snsn}$ in order to adjust the output voltages $V_{out1}$-$V_{outn}$ and/or the load currents.

The controller 106 also outputs the first control signal $S_1$, the second control signal $S_2$, and the fourth control signal $S_4$. Additionally, the controller 106 outputs multiple instances of the third control signal $S_3$, referred to herein as the third control signals $S_{31}$-$S_{3n}$, and multiple instances of a fifth control signal $S_{51}$-$S_{5n}$. The third control signals $S_{31}$-$S_{3n}$ control respective ones of the third switches $123_1$-$123_n$, and the fifth control signals $S5_1$-$S5_n$ control respective ones of the fifth switches $403_1$-$403_n$. For example, the third control signal $S_{3n}$ determines whether the third switch $123_n$ is in its on state or off state, and the fifth control signal $S_{5n}$ determines whether the fifth switch $403_n$ is in its on state or off state.

Figure 5:
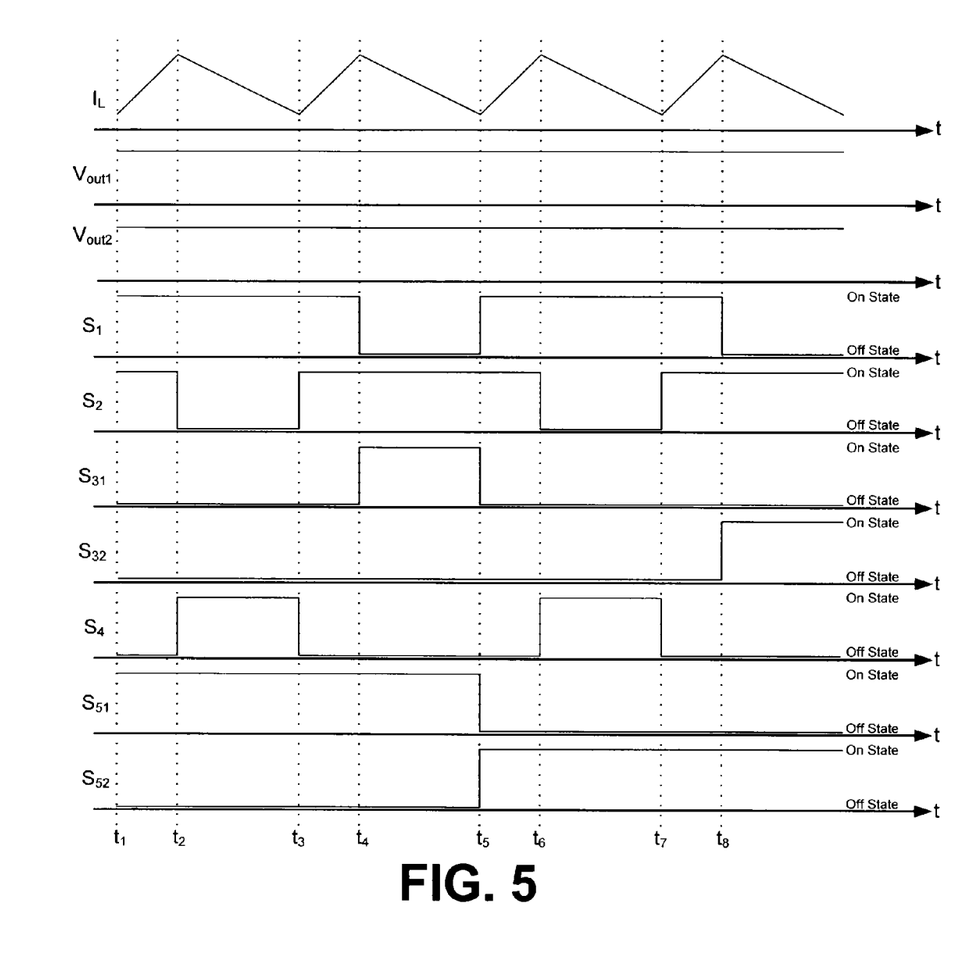
FIG. 5 is a timing diagram showing an example of signals associated with the power stage of FIG. 4.

With reference to FIG. 5, shown is a timing diagram depicting an example of portions of functionality associated with the power stage 400 (FIG. 4). In, particular, the timing diagram of FIG. 5 shows the levels of the current $I_L$ that flows through the inductor 113 (FIG. 4), the output voltage $V_{out1}$ for the load $109_1$ (FIG. 4), the output voltage $V_{out2}$ for the load $109_2$ (FIG. 4), the first control signal $S_1$ that controls the first switch 116 (FIG. 4), the second control signal $S_2$ that controls the second switch 119 (FIG. 4), the third control signal $S_{31}$ that controls the third switch $123_1$ (FIG. 4), the third control signal $S_{32}$ that controls the third switch $123_2$ (FIG. 4), the fourth control signal $S_4$ that controls the fourth switch 126 (FIG. 4), the fifth control signal $S_{51}$ that controls the fifth switch $403_1$ (FIG. 4), and the fifth control signal $S_{52}$ that controls the fifth control switch $403_2$ (FIG. 4). In the embodiment shown in FIG. 5, high levels for the first control signal $S_1$, the second control signal $S_2$, the third control signal $S_{31}$ the third control signal $S_{32}$, the fourth control signal $S_4$, the fifth control signal $S_{51}$, and the fifth control signal $S_{52}$ cause the respective switches to be in the on states. Additionally, low levels for the first control signal $S_1$, the second control signal $S_2$, the third control signal $S_{31}$ the third control signal $S_{32}$, the fourth control signal $S_4$, the fifth control signal $S_{51}$, and the fifth control signal $S_{52}$ cause the respective switches to be in the off states. However, it is understood that in alternative embodiments, alternative signal levels may cause the respective switches to be in the off states or the on states.

Beginning at time $t_1$, the power stage 400 is in a state in which the inductor 113 energizes. The current $I_L$ increases as time progresses, and the output voltage $V_{out1}$ and the output voltage $V_{out2}$ are at relatively constant levels. The first control signal $S_1$, the second control signal $S_2$, and the fifth control signal $S_{51}$ are high, causing the first switch 116, the second switch 119, and the fifth switch $403_1$ to be in on states. The third control signal $S_{31}$, the third control signal $S_{32}$, the fourth control signal $S_4$, and the fifth control signal $S_{52}$ are low, causing the third switch $123_1$, the third switch $123_2$, the fourth switch 126, and the fifth switch $403_2$ to be in off states.

At time $t_2$, the power stage 400 transitions to a state in which the inductor 113 de-energizes and the second capacitor $136_1$ charges. As shown, the current $I_L$ decreases as time progresses, and the output voltage $V_{out1}$ and output voltage $V_{out2}$ are at relatively constant levels. The first control signal $S_1$, the fourth control signal $S_4$, and the fifth control signal $S_{51}$ are high, causing the first switch 116, the fourth switch 126, and the fifth switch $403_1$ to be in on states. The second control signal $S_2$, the third control signal $S_{31}$, the third control signal $S_{32}$, and the fifth control signal $S_{52}$ are low, causing the second switch 119, the third switch $123_1$, the third switch $123_2$, and the fifth switch $403_2$ to be in off states.

At time $t_3$, the power stage 400 transitions to a state in which the inductor 113 energizes. As shown, the current $I_L$ increases as time progresses, and the output voltage $V_{out1}$ and the output voltage $V_{out2}$ are at relatively constant levels. The first control signal $S_1$, the second control signal $S_2$, and the fifth control signal $S_{51}$ are high, causing the first switch 116, the second switch 119, the fifth switch $403_1$ to be in on states. The third control signal $S_{31}$, the third control signal $S_{32}$, the fourth control signal $S_4$, and the fifth control signal $S_{52}$ are low, causing the third switch $123_1$, the third switch $123_2$, the fourth switch 126, and the fifth switch $403_2$ to be in off states.

At time $t_4$, the power stage 400 transitions to a state in which the inductor 113 de-energizes and the first capacitor $133_1$ charges. As shown, the current $I_L$ decreases as time progresses, and the output voltage $V_{out1}$ and the output voltage $V_{out2}$ are at relatively constant levels. The second control signal $S_2$, the third control signal $S_{31}$, and the fifth control signal $S_{51}$ are high, causing the second switch 119, the third switch $123_1$, and the fifth switch $403_1$ to be in on states. The first control signal $S_1$, the third control signal $S_{32}$, the fourth control signal $S_4$, and the fifth control signal $S_{52}$ are low, causing the first switch 116, the third switch $123_2$, the fourth switch 126, and the fifth switch $403_2$ to be in off states.

At time $t_5$, the power stage 400 transitions to a state in which the inductor 113 energizes. The current $I_L$ increases as time progresses, and the output voltage $V_{out1}$ and the output voltage $V_{out2}$ are at relatively constant levels. The first control signal $S_1$, the second control signal $S_2$, and the fifth control signal $S_{52}$ are high, causing the first switch 116, the second switch 119, and the fifth switch $403_2$ to be in on states. The third control signal $S_{31}$, the third control signal $S_{32}$, the fourth control signal $S_4$, and the fifth control signal $S_{51}$ are low, causing the third switch $123_1$, the third switch $123_2$, the fourth switch 126, and the fifth switch $403_1$ to be in off states.

At time $t_6$, the power stage 400 transitions to a state in which the inductor 113 de-energizes and the second capacitor $136_2$ charges. As shown, the current $I_L$ decreases as time progresses, and the output voltage $V_{out1}$ and output voltage $V_{out2}$ are at relatively constant levels. The first control signal $S_1$, the fourth control signal $S_4$, and the fifth control signal $S_{52}$ are high, causing the first switch 116, the fourth switch 126, and the fifth switch $403_2$ to be in on states. The second control signal $S_2$, the third control signal $S_{31}$, the third control signal $S_{32}$, and the fifth control signal $S_{51}$ are low, causing the second switch 119, the third switch $123_1$, the third switch $123_2$, and the fifth switch $403_1$ to be in off states.

At time $t_7$, the power stage 400 transitions to a state in which the inductor 113 energizes. As shown, the current $I_L$ increases as time progresses, and the output voltage $V_{out1}$ and the output voltage $V_{out2}$ are at relatively constant levels. The first control signal $S_1$, the second control signal $S_2$, and the fifth control signal $S_{52}$ are high, causing the first switch 116, the second switch 119, and the fifth switch $403_2$ to be in on states. The third control signal $S_{31}$, the third control signal $S_{32}$, the fourth control signal $S_4$, and the fifth control signal $S_{51}$ are low, causing the third switch $123_1$, the third switch $123_2$, the fourth switch 126, and the fifth switch $403_2$ to be in off states.

At time $t_8$, the power stage 400 transitions to a state in which the inductor 113 de-energizes and the first capacitor $133_2$ charges. As shown, the current $I_L$ decreases as time progresses, and the output voltage $V_{out1}$ and the output voltage $V_{out2}$ are at relatively constant levels. The second control signal $S_2$, the third control signal $S_{32}$, and the fifth control signal $S_{52}$ are high, causing the second switch 119, the third switch $123_2$, and the fifth switch $403_2$ to be in on states. The first control signal $S_1$, the third control signal $S_{31}$, the fourth control signal $S_4$, and the fifth control signal $S_{51}$ are low, causing the first switch 116, the third switch $123_1$, the fourth switch 126, and the fifth switch $403_1$ to be in off states.

Figure 6:
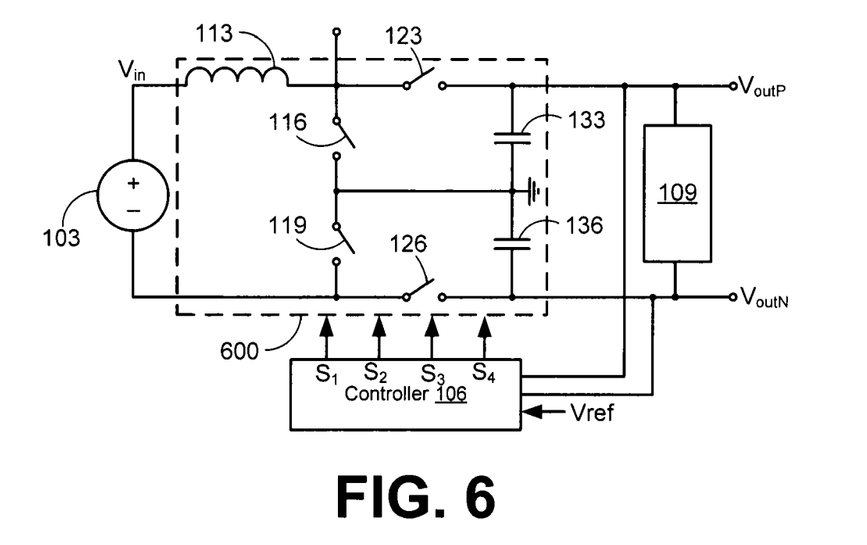
FIG. 6 is a drawing of another example of a power stage capable of delivering bipolar voltages.

With reference to FIG. 6, shown is a third example of a three-level power stage 100 (FIG. 1), referred to herein as the power stage 600. In particular, the power stage 600 is shown coupled to the voltage source 103, the controller 106, and the load 109.

The power stage 600 is similar to the power stage 100 shown in FIG. 1. However, the power stage 600 shown in FIG. 6 is a bipolar-output power stage. In this regard, the power stage 600 is configured to output a positive output voltage $V_{outP}$ and a negative output voltage $V_{outN}$. To this end, the first capacitor 133 and the second capacitor 136 are coupled to ground as shown. Thus, the power stage 600 can provide the positive output voltage $V_{outP}$ and the negative output voltage $V_{outN}$ and regulate the outputs by controlling the first switch 116, the second switch 119, the third switch 123, and/or the fourth switch 126 in a manner as previously described.

The controller 106 in the embodiment shown in FIG. 6 receives at least one reference voltage $V_{ref}$, the positive output voltage $V_{outp}$, and the negative output voltage $V_{outn}$. The controller 106 may compare the positive output voltage $V_{outp}$ and/or the negative output voltage $V_{outn}$ to the voltage $V_{ref}$ in order to generate the control signals $S_1$-$S_4$ to thereby adjust the positive output voltage $V_{outp}$, the negative output voltage $V_{outn}$, and/or the load current.

Figure 7:
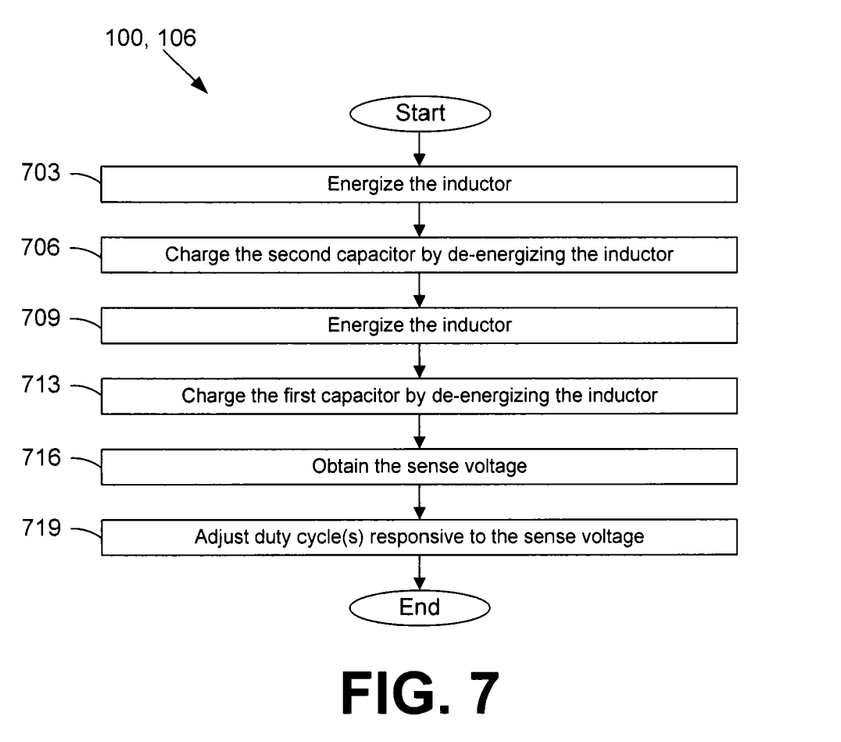
FIG. 7 is a flowchart illustrating an example of functionality implemented by the power stage of FIG. 1.

With reference to FIG. 7, shown is a flowchart illustrating an example of functionality implemented by the power stage 100 and/or the controller. It is understood that the flowchart of FIG. 7 provides merely an example of the many different types of functionality that may be implemented by power stage 100 and/or the controller 106 as described herein.

At number 703, the inductor 113 (FIG. 1) is energized. To this end, the first switch 116 and the second switch 119 may be configured to be in on states, and the third switch 123 and the fourth switch 126 may be configured to be in off states. Simultaneously, the first capacitor 133 (FIG. 1) and/or the second capacitor 136 (FIG. 1) may discharge to provide the output voltage $V_{out}$.

As shown at number 706, the second capacitor 136 is then charged by de-energizing the inductor 113. Charging the second capacitor 136 by de-energizing the inductor 113 may be accomplished, for example, by configuring the first switch 116 and the fourth switch 126 to be in on states, with the second switch 119 and the third switch 123 in off states. Simultaneously, the first capacitor 133 may discharge to provide the output voltage $V_{out}$.

As indicated at number 709, the inductor 113 is then energized. To this end, the first switch 116 and the second switch 119 may be configured to be in on states, and the third switch 123 and the fourth switch 126 may be configured to be in off states. Simultaneously, the first capacitor 133 and/or the second capacitor 136 may discharge to provide the output voltage $V_{out}$.

The first capacitor 133 is then charged by de-energizing the inductor 113, as shown at number 713. To charge the first capacitor 133 by de-energizing the inductor 113, the second switch 119 and the third switch 123 can be configured to be in on states, and the first switch 116 and the fourth switch 126 can be configured to be in off states. Simultaneously, the second capacitor 136 may discharge to provide the output voltage $V_{out}$.

Next, as shown at number 716, the controller 106 obtains the sense voltage $V_{sns}$. As previously discussed, the level of the sense voltage $V_{sns}$ may correspond to the level of the output voltage $V_{out}$ or the load current. Thus, as indicated at number 719, the controller 106 adjusts one or more duty cycles in order to adjust the level of the output voltage $V_{out}$. The process described above may be repeated, for example, as long as the power stage 100 and the controller 106 are powered. Thereafter, the process ends.

Although the flowchart of FIG. 7 shows a specific order of execution, it is understood that the order of execution may differ from that which is depicted. For example, the order of execution of two or more numbers may be scrambled relative to the order shown. Also, two or more numbers shown in succession may be executed concurrently or with partial concurrence. Further, in some embodiments, one or more of the numbers shown may be skipped or omitted. In addition, any number of elements might be added to the logical flow described herein, for purposes of enhanced utility, accounting, performance measurement, or providing troubleshooting aids, etc. It is understood that all such variations are within the scope of the present disclosure.

The components described herein may be implemented by circuitry. In this regard, such circuitry may be arranged to perform the various functionality described above by generating and/or responding to electrical or other types of signals. The circuitry may be general purpose hardware or hardware that is dedicated to performing particular functions. The circuitry may include, but is not limited to, discrete components, integrated circuits, or any combination of discrete components and integrated circuits. Such integrated circuits may include, but are not limited to, one or more microprocessors, system-on-chips, application specific integrated circuits, digital signal processors, microcomputers, central processing units, programmable logic devices, state machines, other types of devices, and/or any combination thereof. As used herein, the circuitry may also include interconnects, such as lines, wires, traces, metallization layers, or any other element through which components may be coupled. Additionally, the circuitry may be configured to execute software to implement the functionality described herein.

It is emphasized that the above-described embodiments of the present disclosure are merely examples of implementations to set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An apparatus, comprising:
a first capacitor coupled to a load;
a second capacitor coupled to the load;
an inductor; and
a plurality of switches operable in a first power stage state, a second power stage state, and a third power stage state, wherein the third power stage state occurs subsequent to the first power stage state and prior to the second power stage state;
wherein, when in the first power stage state, the plurality of switches are configured such that the first capacitor discharges to the load and the second capacitor charges;
wherein, when in the second power stage state, the plurality of switches are configured such that the second capacitor discharges to the load and the first capacitor charges; and
wherein, when in the third power stage state, the plurality of switches are configured such that the inductor energizes and the first capacitor discharges to the load.

2. The apparatus of claim 1, wherein the plurality of switches are operable in a fourth power stage state that occurs subsequent to the second power stage state; and
wherein, when in the fourth power stage state, the plurality of switches are configured such that the inductor energizes and the second capacitor discharges to the load.

3. The apparatus of claim 1, wherein the plurality of switches comprise:
a first switch comprising a first switch first terminal and a first switch second terminal;
a second switch comprising a second switch first terminal and a second switch second terminal, the second switch first terminal being coupled to the first switch second terminal;
a third switch comprising a third switch first terminal and a third switch second terminal, the third switch first terminal being coupled to the first switch first terminal, the third switch second terminal being coupled to the first capacitor and to the load; and
a fourth switch comprising a fourth switch first terminal and a fourth switch second terminal, the fourth switch first terminal being coupled to the second switch second terminal, the fourth switch second terminal being coupled to the second capacitor and to the load.

4. The apparatus of claim 3, wherein, when the plurality of switches are in the first power stage state:
the first switch is in a first switch on state;
the second switch is in a second switch off state;
the third switch is in a third switch off state; and
the fourth switch is in a fourth switch on state.

5. The apparatus of claim 3, wherein, when the plurality of switches are in the second power stage state:
the first switch is in a first switch off state;
the second switch is in a second switch on state;
the third switch is in a third switch on state; and
the fourth switch is in a fourth switch off state.

6. The apparatus of claim 3, wherein the plurality of switches further comprise a fifth switch comprising a fifth switch first terminal and a fifth switch second terminal, the fifth switch first terminal being coupled to the first switch second terminal and to the second switch first terminal, the fifth switch second terminal being coupled to the first capacitor and to the second capacitor, wherein the fifth switch determines whether the second capacitor is to be charged.

7. A method, comprising:
configuring a plurality of switches in a first power stage state such that an inductor energizes;
configuring the plurality of switches in a second power stage state such that the inductor de-energizes to charge a second capacitor, wherein a first capacitor discharges to a load when the plurality of switches are in the second power stage state;
configuring the plurality of switches in a third power stage state such that the inductor energizes; and
configuring the plurality of switches in a fourth power stage state such that the inductor de-energizes to charge the first capacitor, wherein the second capacitor discharges to the load when the plurality of switches are in the fourth power stage state.

8. The method of claim 7, further comprising:
detecting an output signal associated with the load; and
adjusting, responsive to the output signal, a duty cycle that is controlled by the plurality of switches.

9. The method of claim 8, wherein adjusting the duty cycle comprises adjusting a timing for at least one of the first power stage state, the second power stage state, the third power stage state, or the fourth power stage state.

10. The method of claim 7, further comprising:
configuring the plurality of switches in a fifth power stage state such that the inductor energizes;
configuring the plurality of switches in a sixth power stage state such that the inductor de-energizes to charge a third capacitor, wherein a fourth capacitor discharges to a second load when the plurality of switches are in the fifth power stage state;
configuring the plurality of switches in a seventh power stage state such that the inductor energizes; and
configuring the plurality of switches in an eighth power stage state such that the inductor de-energizes to charge the fourth capacitor, wherein the third capacitor discharges to the second load when the plurality of switches are in the eighth power stage state.

11. The method of claim 10, wherein the load comprises a first plurality of light emitting diodes coupled in series with respect to each other, and the second load comprises a second plurality of light emitting diodes coupled in series with respect to each other.

12. The method of claim 10, further comprising:
obtaining a first signal associated with the load;
adjusting, responsive to the first signal, a first duty cycle for the load;
obtaining a second signal associated with the second load; and
adjusting, responsive to the second signal, a second duty cycle for the second load.

13. An apparatus, comprising:
a power stage comprising:
a first capacitor coupled to a load;
a second capacitor coupled to the load;
an inductor; and
a plurality of switches operable in a first power stage state, a second power stage state, and a third power stage state; and
a controller for the power stage, wherein the controller is operable to transition the power stage to the first power stage state such that the first capacitor discharges to the load and the second capacitor charges, wherein the controller is operable to transition the power stage to the second power stage state such that the second capacitor discharges to the load and the first capacitor charges, and wherein the controller is operable to transition the power stage to the third power stage state subsequent to the first power stage state and prior to the second power stage state such that that the inductor energizes and the first capacitor discharges to the load.

14. The apparatus of claim 13, wherein:
the controller is operable to transition the power stage to a fourth power stage state subsequent to the second power stage state; and
when in the fourth power stage state, the plurality of switches are configured such that the inductor energizes and the second capacitor discharges to the load.

15. The apparatus of claim 13, wherein the plurality of switches comprise:
a first switch comprising a first switch first terminal and a first switch second terminal;
a second switch comprising a second switch first terminal and a second switch second terminal, the second switch first terminal being coupled to the first switch second terminal;
a third switch comprising a third switch first terminal and a third switch second terminal, the third switch first terminal being coupled to the first switch first terminal, the third switch second terminal being coupled to the first capacitor and to the load; and
a fourth switch comprising a fourth switch first terminal and a fourth switch second terminal, the fourth switch first terminal being coupled to the second switch second terminal, the fourth switch second terminal being coupled to the second capacitor and to the load.

16. The apparatus of claim 15, wherein, when the plurality of switches are in the first power stage state:
the first switch is in a first switch on state;
the second switch is in a second switch off state;
the third switch is in a third switch off state; and
the fourth switch is in a fourth switch on state.

17. The apparatus of claim 15, wherein, when the plurality of switches are in the second power stage state:
the first switch is in a first switch off state;
the second switch is in a second switch on state;
the third switch is in a third switch on state; and
the fourth switch is in a fourth switch off state.

18. The apparatus of claim 15, wherein the plurality of switches further comprise a fifth switch comprising a fifth switch first terminal and a fifth switch second terminal, the fifth switch first terminal being coupled to the first switch second terminal and the second switch first terminal, the fifth switch second terminal being coupled to a third capacitor and to a fourth capacitor, wherein the fifth switch determines whether the fourth capacitor is to be charged.

* * * * *